US011223811B2

(12) United States Patent
Straub et al.

(10) Patent No.: US 11,223,811 B2
(45) Date of Patent: *Jan. 11, 2022

(54) SPACE EFFICIENCY AND MANAGEMENT OF CONTENT

(71) Applicant: Time Warner Cable Enterprises LLC, St. Louis, MO (US)

(72) Inventors: Albert Straub, Westminster, CO (US); Edward P. Galt, III, Boulder, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 103 days.

This patent is subject to a terminal disclaimer.

(21) Appl. No.: 16/222,078

(22) Filed: Dec. 17, 2018

(65) Prior Publication Data
US 2019/0124312 A1 Apr. 25, 2019

Related U.S. Application Data

(63) Continuation of application No. 13/870,100, filed on Apr. 25, 2013, now Pat. No. 10,182,219.

(51) Int. Cl.
| | |
|---|---|
| *H04N 19/40* | (2014.01) |
| *H04N 9/804* | (2006.01) |
| *H04N 5/775* | (2006.01) |
| *H04N 9/82* | (2006.01) |
| *H04N 21/4402* | (2011.01) |
| *H04N 21/432* | (2011.01) |
| *H04N 21/433* | (2011.01) |

(52) U.S. Cl.
CPC .......... *H04N 9/8042* (2013.01); *H04N 5/775* (2013.01); *H04N 9/8205* (2013.01); *H04N 19/40* (2014.11); *H04N 21/4325* (2013.01); *H04N 21/4332* (2013.01); *H04N 21/4402* (2013.01); *H04N 21/440236* (2013.01)

(58) Field of Classification Search
CPC ........ H04N 9/804; H04N 19/40; H04N 5/775; H04N 21/432; H04N 9/82
See application file for complete search history.

(56) References Cited

U.S. PATENT DOCUMENTS

| | | |
|---|---|---|
| 6,233,389 B1 | 5/2001 | Barton et al. |
| 8,275,732 B2 | 9/2012 | Candelore et al. |
| | (Continued) | |

*Primary Examiner* — Dave Czekaj
*Assistant Examiner* — Berteau Joisil
(74) *Attorney, Agent, or Firm* — Armis IP Law, LLC

(57) ABSTRACT

A transcoder resource retrieves content stored in a repository. The stored content can be encoded in accordance with a first encoding format. The transcoder resource transcodes the retrieved content into a second encoding format. To increase available capacity, the transcoder resource stores the content in the second encoding format as a replacement to the content encoded according to the first encoding format. The second encoding format can support a higher compression ratio than the first encoding format. Additionally, the transcoding can be performed as one of multiple tasks executed in parallel. In such an instance, during parallel processing, a content management resource interleaves execution of the main processing task and the background task of transcoding the content into the second encoding format. The transcoding task can be assigned a lower execution priority than one or more other tasks executed in parallel.

31 Claims, 9 Drawing Sheets

(56) References Cited

U.S. PATENT DOCUMENTS

| | | | |
|---|---|---|---|
| 8,855,189 B1* | 10/2014 | Krause | H04N 21/234309 |
| | | | 375/240 |
| 2003/0066084 A1* | 4/2003 | Kaars | H04N 21/4147 |
| | | | 725/89 |
| 2011/0093900 A1 | 4/2011 | Patel et al. | |
| 2014/0164760 A1* | 6/2014 | Hybertson | H04N 21/440218 |
| | | | 713/153 |

* cited by examiner

SPACE EFFICIENCY AND MANAGEMENT OF CONTENT

RELATED APPLICATION

This application is a continuation of earlier filed U.S. patent application Ser. No. 13/870,100 entitled "SPACE EFFICIENCY AND MANAGEMENT OF CONTENT," assigned Docket No.: TWC13-07(13-16), filed on Apr. 25, 2013, the entire teachings of which are incorporated herein by this reference.

BACKGROUND

The majority of cable television content providers distribute their signals in a respective transport stream by digitizing the signals using an encoding format such as MPEG-2 (Motion Picture Experts Group-2). Encoding in accordance with MPEG-2 TS (MPEG-2 Transport Stream) works well for cable television because it is a broadcast service. MPEG-2 TS encoding does not include specific device delivery address information and thus affords higher transport efficiency.

Several modes can be used to transfer the MPEG-2 TS to one or more end users in a current state of the art shared cable network system. In one mode, the MPEG-2 TS is Quadrature Amplitude Modulated (QAM) at a base-band frequency and then Amplitude Modulated (AM) onto a laser signal for fiber optic transmission to a distribution hub in a cable network environment. The distribution hub forwards the signal as an AM laser signal to a distribution node. The receiving distribution node converts the laser signal back to RF at a particular frequency and then combines it with other signals for final transmission over a coaxial cable to the end users in the cable network environment.

In more advanced systems, the MPEG-2 TS is IP (Interest Protocol) encapsulated and sent to the hub using the User Datagram Protocol (UDP). UDP is beneficial because it is a "best effort" delivery protocol. Thus, no overhead is incurred with retransmissions due to lost packets.

In accordance with broadcast technology, a common encoded signal can be transmitted over the coaxial cable to all of the end subscribers in a service group. Thus, if a television station is encoded at a bit rate of 10 M bits per second (Mbps), then 10 Mbps of the transport pipe—for example, fiber optic link, coaxial cable, etc—is consumed for all subscribers.

U.S. Pat. No. 6,233,389 issued to Barton describes a mechanism in which a television signal is digitized and stored to a disk drive. The format of a digital signal is described in that patent as an MPEG-2 formatted signal. Receipt and storage of an MPEG-2 signal in a disk drive is convenient in current cable systems because, as discussed above, cable systems currently use an MPEG-2 TS format for distributing video. To record one of these signals in a disk drive, the system simply has to receive the signal, decrypt it if necessary, re-encrypt it using a local encryption, and then write the content to the disk drive or other storage media.

At issue is the finite storage capacity of a disk drive. That is, the disk drive eventually fills up with so much data that no more content can be stored in the disk drive. Encoding in accordance with the MPEG-2 standard is not the most efficient currently available encoding mechanism. Encoding in accordance with MPEG-4, section 10, is much more efficient because the MPEG-4 provides a higher degree of compression, without a substantial loss of quality.

New DVRs (Digital Video Recorders) incorporate a mechanism for un-encrypting (or decrypting) the content on the disk drive, re-encoding of the content into a format useable by a remote storage or playback device, application of a Digital Rights Management technology associated with an remote storage or playback device, and then transfer of the newly encoded content to a remote location such as a target device.

The majority of remote storage/playback devices now use MPEG-4 as a video encoding format. Soon, most portable devices will utilize the HEVC H.265 encoded format. Thus, the new digital video recorders incorporate special circuitry and/or software that can rapidly convert MPEG-2 TS encoded video to MPEG-4 or HEVC H.265 encoded video.

BRIEF DESCRIPTION OF EMBODIMENTS

Conventional storage of content such as storage of content in a digital video recorder suffers from deficiencies. For example, a conventional digital video recorder can receive content encoded in accordance with MPEG-2 as discussed above. The digital video recorder stores the content in the MPEG-2 format on a storage disk of the digital video recorder. Because the MPEG-2 format does not highly compress the data, the disk in the digital video recorder on which the content is stored tends to be used up quickly.

Embodiments herein deviate with respect to conventional techniques. For example, one embodiment herein is directed to more efficient storage and management of content in a repository having limited capacity.

More specifically, one embodiment herein includes a transcoder resource. The transcoder resource retrieves first content stored in a repository. Assume that the first content is encoded in accordance with a first encoding format, EF1. The transcoder resource transcodes the first content retrieved from the repository into second content. In one embodiment, the transcoder resource produces the second content in accordance with a second encoding format, EF2. The transcoder resource 140 stores the second content (transcoded content) in the repository as a replacement for the first content. Accordingly, embodiments herein include transcoding content stored in a repository from a first encoding format to a second encoding format.

In one embodiment, the second encoding format EF2 supports a higher ratio of compression than the first encoding format EF1. In other words, the amount of storage space needed to store the content encoded in accordance with the second encoding format is less than an amount of capacity required to store the content encoded in accordance with the first encoding format. Thus, transcoding from one encoding format to another is useful.

In certain instances, the content encoded in the first encoding format is deleted subsequent to conversion and storage of the content (in the second encoding format) in the repository. Accordingly, conversion of the content from the first encoding format to the second encoding format saves on storage space.

In accordance with further embodiments, a processor resource stores content in a repository. As mentioned, the content stored in the repository initially can be encoded in accordance with a first encoding format. The processor resource can be configured to schedule transcoding of the content into a second encoding format as a background task having lower priority than a main task (such as execution of a particular command) having a higher priority. A content management resource initiates parallel execution of the main processing task and the background task. During parallel processing of the main task and the background task, the content management resource interleaves execution of the main processing task and execution of the background task of transcoding the content into the second encoding format.

In accordance with yet further embodiments, the content management resource can be configured to schedule transcoding of MPEG-2 content into MPEG-4 content. MPEG-4 is a higher density compression format then MPEG-2. This allows for approximately twice the amount of digital content to be stored in the same amount of disk space with almost no loss in fidelity.

As further described herein, the transcoding/transcryption of content as discussed herein can be performed on demand as a high priority task or can be a best efforts background task performed when processing resources are available. Typically, digital video recorders do not continuously record or playback content. In one embodiment, the transcoding as discussed herein occurs during idle times when a main processor is not tasked with other higher priority matters.

These and other embodiments are disclosed in more detail below.

Note that any of the resources as discussed herein can include one or more computerized devices, computer systems, base stations, wireless communication equipment, communication management systems, workstations, handheld or laptop computers, etc., to carry out and/or support any or all of the method operations disclosed herein. In other words, one or more computerized devices or processor hardware can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor or logic, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment includes a computer readable hardware storage medium having instructions stored thereon. The instructions, when executed by a processor (such as processor hardware), cause the processor to: retrieve first content stored in a repository, the first content encoded in accordance with a first encoding format; transcode the first content into second content, the second content encoded in accordance with a second encoding format; and store the second content in the repository as a replacement of the first content.

Another embodiment includes a computer readable hardware storage medium having instructions stored thereon. The instructions, when executed by a processor (such as a hardware processor resource), cause the processor to: store content in a repository, the content encoded in accordance with a first encoding format; schedule transcoding of the content into a second encoding format as a background task; execute a particular command as a main processing task; and interleave execution of the main processing task and the background task of transcoding the content into the second content.

Yet another embodiment includes a computer readable hardware storage medium having instructions stored thereon. The instructions, when executed by a processor (such as processor hardware), cause the processor to: receive content over a shared communication link in a cable network environment, the content encoded in accordance with a first encoding format; encrypt the received content; store the encrypted content in a repository; retrieve the encrypted content stored in the repository; decrypt the retrieved content; transcode the content into a second encoding format; encrypt the transcoded content; and store the encrypted transcoded content in the repository as a replacement of the content encoded in accordance with the first encoding format.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, logic, or as hardware alone such as within a processor, or within an operating system, or a within a software application, etc.

As discussed herein, techniques herein are well suited for management and storage of content. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional summary and details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

As discussed above, a transcoder resource retrieves content stored in a repository. Assume that the content in the repository is encoded in accordance with a first encoding format, EF1. The transcoder resource transcodes the first content retrieved from the repository into a second encoding format, EF2. The transcoder resource 140 stores the transcoded content in the repository as a replacement for the first content. In one embodiment, the second encoding format EF2 supports a higher ratio of compression than the first encoding format EF1. The content encoded in the first encoding format is deleted subsequent to conversion and storage of the transcoded content in the repository. Accordingly, conversion of the content from the first encoding format EF1 to the second encoding format EF2 saves on storage space.

Figure 1:
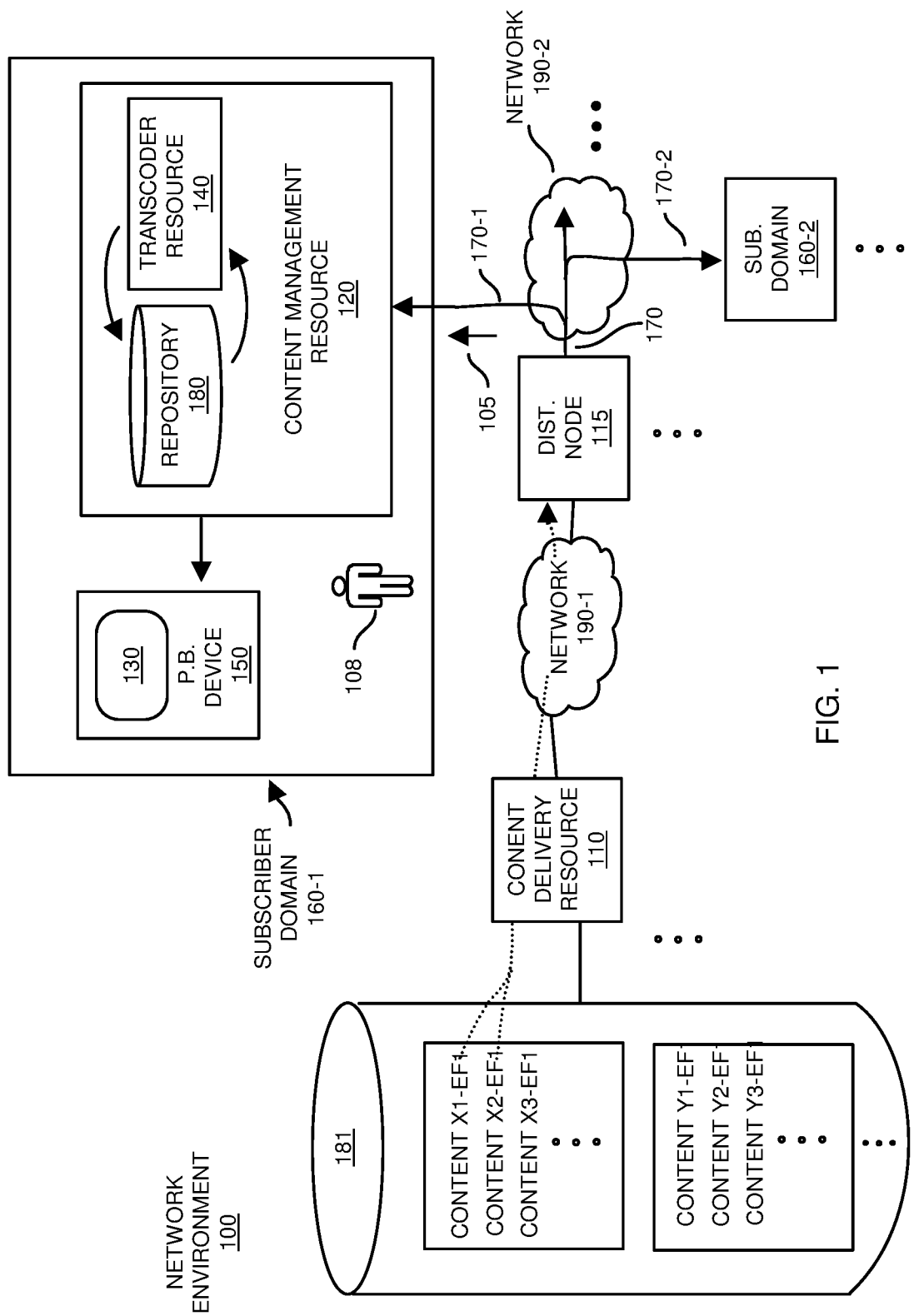
FIG. 1 is an example diagram illustrating management and transcoding of content according to embodiments herein.

More specifically, FIG. 1 is an example diagram of a network environment facilitating novel transcoding of content according to embodiments herein.

As shown, network environment 100 includes repository 181, content delivery resource 110, network 190-1, distribution node 115, network 190-2, shared communication link 170, and multiple different subscriber domains 160 (e.g., subscriber domain 160-1, subscriber domain 160-2, etc.).

By further way of a non-limiting example, each of the subscriber domains 160 (e.g., subscriber domain 160-1, subscriber domain 160-2, . . . ) can represent a region controlled by a respective subscriber such as a home environment, business environment, etc., to receive communications transmitted over the shared communication link 170 of network 190-2.

The network environment 100 can be a cable television network environment in which the distribution node 115 transmits content to subscribers in a respective service group. For example, the content delivery resource 110 may be a server or other suitable resource configured to receive or retrieve content from repository 181 and communicate such content over network 190-1 to distribution node 115. Distribution node 115 forwards content as one or more signals over shared communication link 170.

The content (e.g., content X1, content X2, content X3, . . . , content Y1, content Y2, content Y3, etc.) stored in repository 181 can be distributed to subscriber domains 160 in any suitable manner. For example, the content in repository 181 can be transmitted over the shared communication link 170 in one or more broadcast channels, one or more video on demand channels, one or more over-the-top content channels such as via Internet connections, one or more client-server channels, etc.

As mentioned, distribution node 115 initiates transmission of received data over shared communication link 170 (e.g., communication link 170-1, communication link 170-2, etc.) in network 190-2 to one or more respective subscribers that reside in respective subscriber domains 160.

Note that each respective subscriber domain 160 may extend beyond a particular region such as a home environment. For example, a user may operate a respective playback device (that is sometimes used in the home) in a publicly accessible WiFi network external to the home environment. In such an instance, the subscriber domain as discussed herein may extend to the playback device operated by the user outside of the immediate home environment.

As mentioned, in one embodiment, the distribution node 150 distributes content to subscribers in network 190-2. In certain instances, in a reverse direction, note that each subscriber domain 160 can communicate in a reverse direction over network 190-2 to the content delivery resource 140. Accordingly, if desired, the communication link 170 in network 190-2 can support two-way data traffic.

Each subscriber domain 160 (e.g., subscriber domain 160-1, subscriber domain, 160-2, etc.) coupled to network 190-2 or shared communication link 170 can include one or more types of playback devices.

In this non-limiting example embodiment, subscriber domain 160-1 includes playback device 150. Playback devices 150 can be any type communication or processing device such as personal computers, mobile computer devices, televisions, set-top boxes, mobile devices, personal digital assistants, touch pad devices, portable computers, wire-line telephones, cable set-top boxes, televisions, display screens, wireless phones, wireless mobile device, Apple™ devices, etc.

In one embodiment, the subscriber domain 160-1 includes a content management resource 120 such as computer device, set-top box, digital video recorder, etc. Content management resource 120 receives content over communication link 170-1 and stores content in respective repository 180. The user 108 inputs commands to content management resource 120 to initiate streaming of content stored in repository 180 to playback device 150.

Note that repository 180 can reside at any suitable location internal or external to content management resource 120. As shown, the repository may be located locally within the content management resource 120 of subscriber domain 160-1.

Content management resource 120 includes a transcoder resource 120. As its name suggests, the transcoder resource 120 can be configured to transcode content from one encoding format to another encoding format. As an example, assume that the content management resource 120 receives and stores first content in repository 180. The first content can be encoded in accordance with a first encoding format. The transcoder resource 140 transcodes the first content (in a first encoding format) into second content (in a second encoding format). Subsequent to transcoding, the transcoder resource 140 stores the second content in the repository 180 as a replacement to the first content. Accordingly, embodiments herein can include retrieving content from repository 180, transcoding the content from one encoding format to another, and then storing the transcoded content in the repository 180.

As discussed herein, the original received content in the first encoding format can be deleted from the repository 180 subsequent to storing the transcoded content in the repository 180. As discussed later in this specification, to save on available storage capacity associated with repository 180, portions of the content in the first encoding format can be deleted from the repository 180 after the portions are transcoded and stored in the repository 180.

Figure 2:
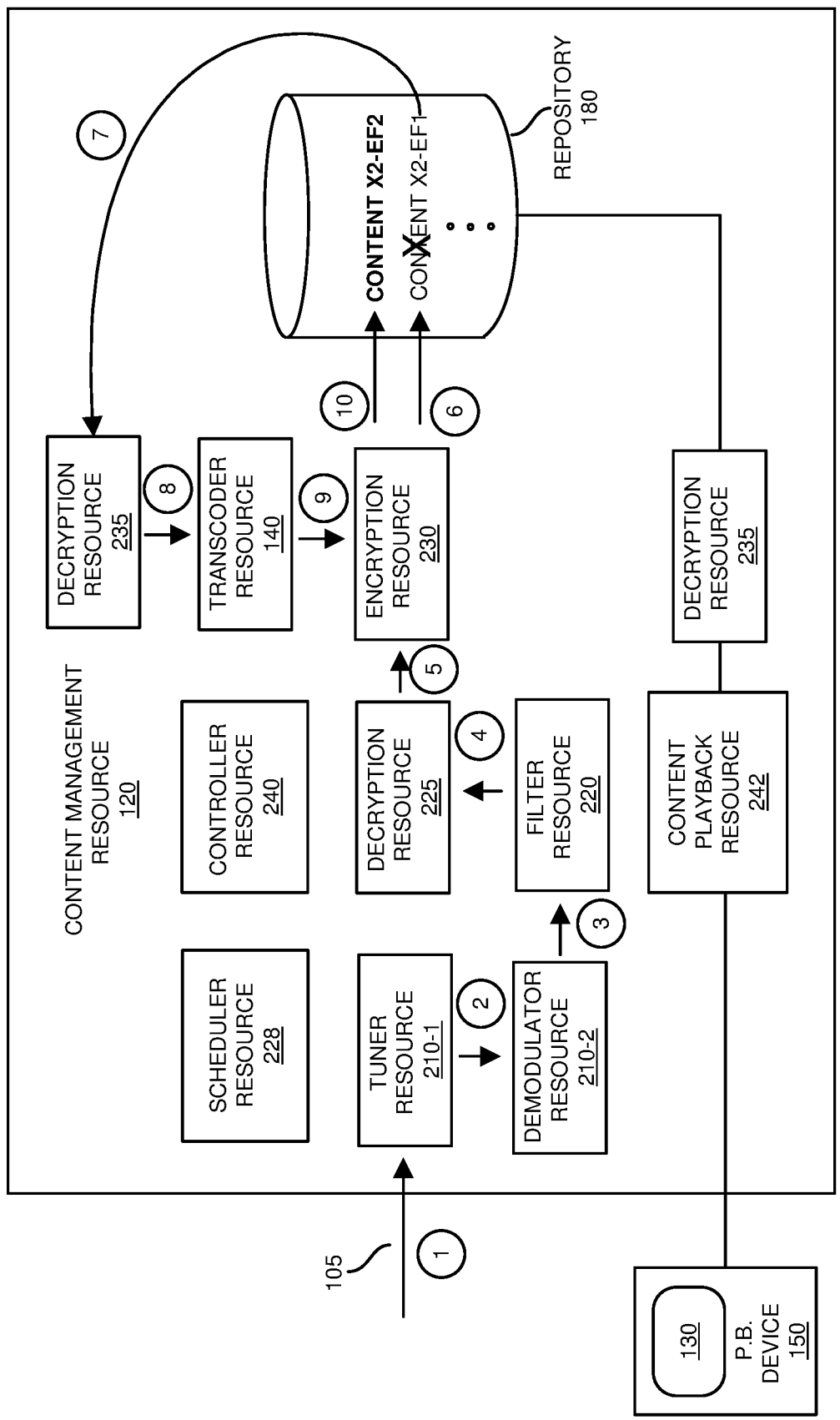
FIG. 2 is an example diagram illustrating transcoding of content from a first encoding format to a second encoding format according to embodiments herein.

FIG. 2 is an example diagram illustrating transcoding of content from a first encoding format to a second encoding format according to embodiments herein.

In one embodiment, content management resource 120 includes controller resource 240. In such an embodiment, and as its name suggests, controller resource 240 controls functionality supported by content management resource 120.

Content management resource 120 can include scheduler resource 228 to schedule different functions such as retrieval and storage of content in repository 180, transcoding of content stored in repository 180, transmission of content stored in repository 180 to a playback device 150, etc.

As shown in step 1, content management resource 120 receives signal 105 over communication link 170-1. In one embodiment, the signal 105 is a QAM modulated signal.

In step 2, the tuner resource 210-1 tunes to a channel including content of interest. In this example embodiment, assume that the content of interest is content X2-EF1 (content X2 encoded in encoding format #1) streamed over shared communication link 170 in signal 105.

In step 3, the demodulator resource 210-2 demodulates the channel of interest to produce a demodulated signal.

In step 4, the filter resource 220 filters out content of interest (i.e., content X2-EF1) from the demodulated signal outputted by demodulator resource 210-2.

In step 5, the decryption resource 225 decrypts the content of interest X2-EF1 outputted from filter resource 220.

In step 6, the encryption resource 230 locally encrypts the content of interest X2-EF1 outputted from decryption resource 225 and stores the encrypted content X2-EF1 in repository 180 as shown.

As previously discussed, transcoder resource 140 can be configured to convert the content X2-EF1 (content X2 encoded in encoding format #1) into content X2-EF2 (content X2 encoded in encoding format #2). For example, in step 7, decryption resource 235 retrieves content X2-EF1 from repository 180. Content X2 can be any type of streaming audio or video content such as a movie, sports event, etc.

In step 8, the decryption resource 235 decrypts the retrieved content X2-EF1.

In step 9, the transcoder resource 140 transcodes the content X2-EF1 into content X2-EF2.

In step 10, the encryption resource 230 locally encrypts the content X2-EF2 and stores it in repository as encrypted content X2-EF2.

By way of a non-limiting example, subsequent to transcoding the content X2 from the first encoding format (such as MPEG-2) to the second encoding format (such as MPEG-4), and storing the transcoded content, the content management resource 120 initiates deletion of the content X2-EF1 from repository 180.

Accordingly, embodiments herein include decrypting first content (e.g., content X2-EF1); transcoding the decrypted first content into second content (e.g., content X2-EF2); and storing the second content in the repository 180 as a replacement of the first content. The content X2-EF2 can be locally encrypted prior to being stored in repository 180.

In one embodiment, as mentioned, the second encoding format supports a substantially same level of quality playback as the first encoding format. However, note that the content encoded in accordance with the second encoding format can require substantially less storage space than the content encoded in accordance with the first encoding format.

In accordance with further embodiments, the second encoding format may require less space to store content but supports a substantially lower level of quality playback than the first encoding format.

The content management resource 120 can be configured to initiate transcoding of content based on any suitable trigger event. For example, the content management resource 120 can be configured to monitor an amount of available storage capacity in the repository 180. The content management resource 120 can be configured to initiate transcoding (via transcoder resource 140) of the first content X2-EF1 into second content X2-EF2 in response to detecting that an amount of available storage capacity of the repository 180 is below a threshold value. In other words, if the repository 180 stores a large amount of content in the first encoding format and available storage space in the repository 180 is low below a threshold value, the content management resource 120 can be configured to initiate transcoding of stored content into a more compressed encoding format such as the second encoding format.

In accordance with another non-limiting example embodiment, the content management resource 120 can be configured to receive a command from a subscriber operating playback device 150. The command can indicate to retrieve the first content stored in the repository 180 for playback. The content X2-EF1 may not yet be transcoded and stored in repository 180 as content X2-EF2. In one non-limiting example embodiment, in response to receiving the command to stream content X2 from the content management resource 120 to the playback device 150: the content management resource 120 initiates transcoding of the content X2-EF1 into the content X2-EF2. Note that the user 108 may or may not specify an encoding format in which to transmit the content.

In this non-limiting example embodiment, subsequent to transcoding, the content playback resource 240 of content management resource 120 streams an unencrypted or encrypted rendition of transcoded content X2-EF2 over a respective communication link such as a network, cable, etc., to playback device 150 operated by the user 108 (subscriber).

In one non-limiting example embodiment, the playback device 150 such as a large screen television is located within the subscriber domain 160-1. A communication link such as an HDMI (High-Definition Multimedia Interface) cable connects the content management resource 120 (such as a set-top box) to the playback device 150. The signal transmitted over the communication link (HDMI cable) can be an unencrypted rendition of transcoded content X2-EF2 to playback respective content on the television.

In accordance with another non-limiting example embodiment, the playback device 150 can be a lap-top, iPad™, computer device, etc., located at a remote location with respect to the subscriber domain 160-1. The user may connect to a WiFi™ access point to retrieve and playback content from their content management resource in subscriber domain 160-1. For example, in one embodiment, the user 108 is able to stream content from the content management resource 120 over a network connection to the playback device 150 at the remote location. In such an instance, the content management resource transmits the requested transcoded content (e.g., transcoded content X2-EF2) as encrypted content over a communication link between the content management resource and the remotely located playback device 150. A rendition of the transcoded content X2-EF2 can be transmitted over an encrypted tunnel using any suitable protocol such as AES-128 (Advanced Encryption Standard-128) encryption, DTCP-IP (Digital Transmission Content Protection), HDCP (High-bandwidth Digital Content Protection), etc., as a protection mechanism. Thus, the transcoded content transmitted to the remotely located playback device 150 can be encrypted for security reasons.

In addition to transcoding and forwarding of content X2-EF2, in a manner as previously discussed, the content management resource 120 initiates storage of the transcoded content X2-EF2 in repository 180. Thus, to reduce network congestion, the requested content can be transcoded into a more compressed data format and then transmitted to the playback device 150. Since the content has already been transcoded to transmit over a network communication link to playback device 150, the transcoded content can be (encrypted and) stored in the repository 180 to save on storage space as a replacement to content X2-EF1.

Also, if appropriate processing resources are available, and as an alternative to first storing content X2-EF1 in repository 180 and then performing steps 7, 8, 9, and 10, embodiments herein can include forwarding decrypted content from decryption resource 225 in step 5 to transcoder resource 140. In such an instance, the transcoder resource 140 transcodes content X2-EF1 into content X2-EF2. Encryption resource 230 encrypts the content X2-EF2 and stores it in repository 180. This latter embodiment reduces or eliminates the need to store the content X2-EF1 in repository 180 as the content X2 is transcoded prior to storage.

As mentioned, the content X2 (in any encoding format) stored in repository 180 can be streamed to a respective playback device 150. For example, in response to the content management resource 120 receiving a command to playback selected content X2-EF2 on display screen 130 of playback device 150, the controller resource 240 initiates decryption of content X2-EF2 stored in repository 180 and, via content playback resource 242, streams the decrypted content to playback device 150.

Yet further variations of embodiments are discussed below.

Figure 3:
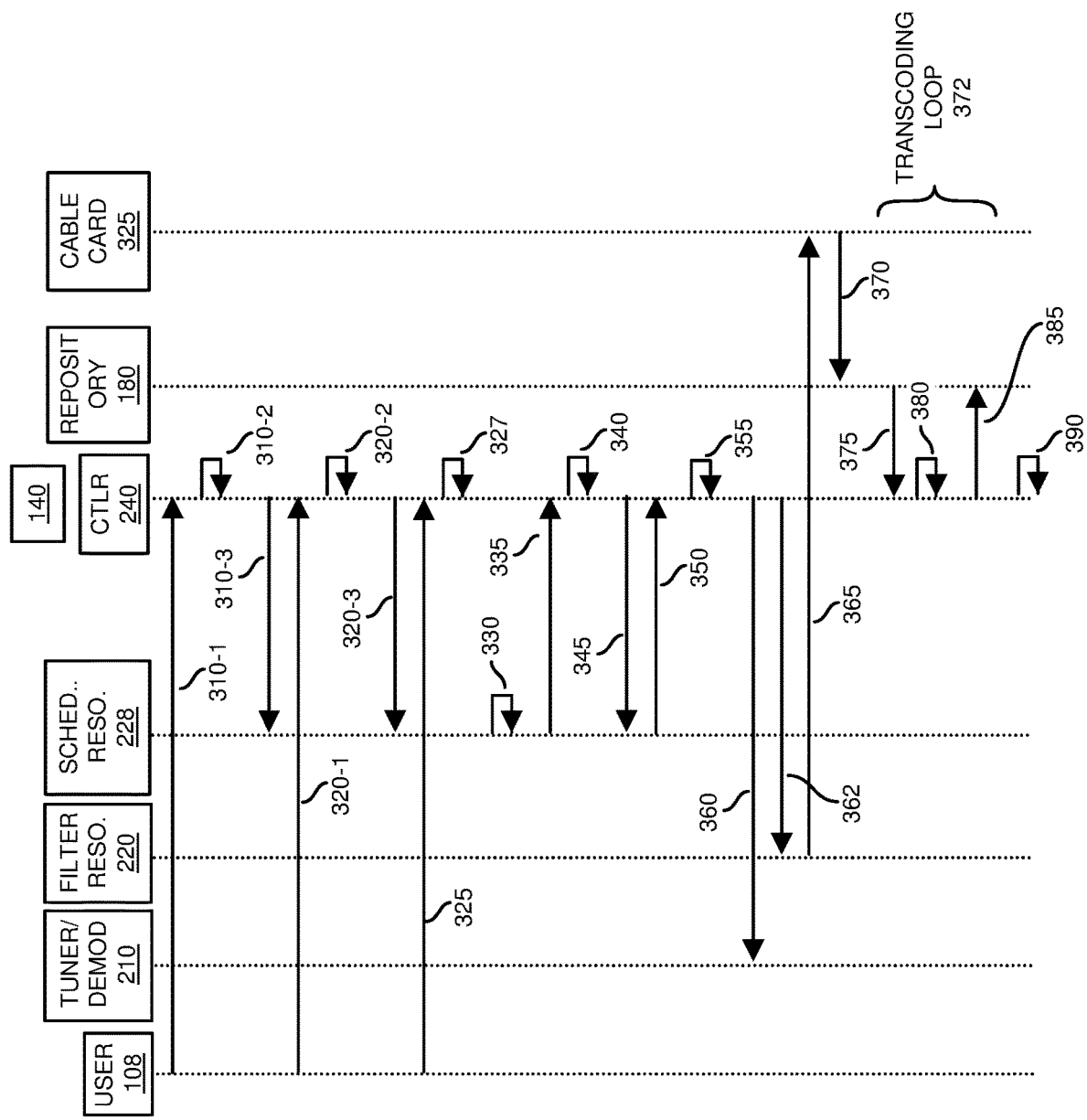
FIG. 3 is an example diagram illustrating communications and operations amongst resources according to embodiments herein.

FIG. 3 is an example diagram illustrating communications amongst resources in a content management resource according to embodiments herein.

Initially, via communications 310-1, the user 108 provides input to the controller resource 240 of content management resource 120. In this example embodiment, the input specifies information such as a program of content X2-EF1 to be recorded in repository 180. The input can specify to record the content X2-EF1 now or at a later point in time as specified by a content guide. Via operations 310-2, the controller resource 240 stores appropriate metadata associated with the request from user 108 to record content X2-EF1. The metadata can indicate a channel on which to tune, a time when the content is broadcasted on the channel, etc.

Via communications 310-3, the controller resource 240 notifies scheduler resource 228 to record content X2-EF1 at the appropriate time when the respective content is broadcasted or available for viewing over communication link 170-1.

In one non-limiting example embodiment, the controller resource 240 is a digital video recorder System On a Chip (SOC) that communicates the recording time and a reference to content metadata to scheduler resource 228. Scheduler resource 228 can be an external timing micro-controller. (Note that the scheduler resource 228 or timing micro-controller may be a portion of the DVR SOC as well as an external device.)

Via communications 320-1, the user 108 provides further input to the controller resource 240. In this example embodiment, the input indicates a program such as content Y2-EF1 to be recorded in repository 180 now or at a later point in time as specified by a content guide. Via operations 320-2, the controller resource 240 stores appropriate metadata indicating the request from user 108 to record content Y2-EF1.

Via communications 320-3, the controller resource 240 notifies scheduler resource 228 of the request to record content Y2-EF1 at the appropriate time when the respective content is broadcasted or available for viewing over communication link 170-1.

If the recording time for content X2-EF1 or content Y2-EF1 is not immediate, via communications 325, the user 108 may command the controller resource 240 that it can go into a low-power, deep-sleep mode. In other words, a user may depower the content management resource 120 by turning it OFF. Via operations 327, the controller resource 240 goes into a sleep mode.

Via operations 330, the scheduler resource 228 repeatedly checks the current time with respect to time to record scheduled programs content X2-EF1 and content Y2-EF1. Upon detecting that a scheduled program of content is streamed and available for recording, the scheduler resource 228 transmits an interrupt signal 335 to controller resource 240. The interrupt signal 335 notifies the controller resource 240 to wake-up. Via operations 340, the controller resource 240 wakes up and is placed in a standard operating ON mode.

Via communications 345 to the scheduler resource 228, the controller resource 240 requests information as to which content is to be recorded in repository 180. In response to the communications 345, the scheduler resource 228 transmits communications 350 to the controller resource 240 indicating to record content X2-EF1. In one embodiment, the communications 350 indicate to begin recording content X2-EF1 on a received channel. Via operations 355, the controller resource 240 retrieves metadata indicating source information such as the content to record, the RF frequency on which to tune, PMT, URL (Uniform Resource Locator), etc., to retrieve the content from as well as an index to text describing the content. The metadata can be saved in human readable form.

Via communications 360, the controller resource 240 notifies the resource 210 (e.g., transcoder resource 210-1) to tune the RF tuner to a specified frequency on which the scheduled content X2-EF1 is available for recording. The resource 210 (such as demodulator resource 210-2) demodulates the signal.

Via communications 362, the controller resource 240 provides filter settings to filter resource 220 so that the filter resource 220 filters out packets of data associated with the scheduled content X2-EF1 to be recorded. In accordance with filter settings, the filter resource 220 produces a data stream of content X2-EF1.

Via communications 365, the filter resource 220 transmits the received portions or data stream of content X2-EF1 to cable card resource 325. Cable card resource 325 can include decryption resource 225 or other suitable resource to decrypt content. The cable card resource 325 decrypts the received video information, audio information, etc. In addition to decryption resource 225, cable card resource 325 can include encryption resource 230. Encryption resource 230 or other suitable resource re-encrypts content X2-EF1 for subsequent storage in repository 180. The encryption by the cable card resource 325 protects the content from being misappropriated after storage in repository 180.

Via operations 370, the cable card resource 325 (or other suitable resource) initiates storage of the encrypted content X2-EF1 in repository 180.

When appropriate processing resources are available, embodiments herein include transcoding (e.g., associated with transcoding loop 372) the content X2-EF1 stored in repository 180. For example, via operations 375, the controller resource 240 initiates retrieval and decryption of the content X2-EF1 stored in repository 180. The controller resource 240 initiates transcoding (via transcoder resource 140) of the content X2-EF1 into content X2-EF2. As discussed herein, via operations 380, the controller resource 240 initiates encryption of transcoded content X2-EF2. Via operations 385, the controller resource 240 initiates storage of the encrypted content X2-EF2 in repository 180. If desired, the content X2-EF1 stored in repository 180 can be deleted to save space.

Upon completing a task of transcoding, the controller resource 240 executes operations 390 to place the content management resource 120 into a sleep mode again.

Note that content management resource 120 may include sufficient processing resources such that it is not necessary to perform the transcoding of content as a background task. For example, as previously discussed, and with reference to FIG. 2, the transcoder resource 140 can receive the decrypted signal directly from decryption resource 225. The transcoder resource 140 transcodes the received content X2-EF1 into content X2-EF2. Transcoder resource 140 forwards the transcoded content X2-EF2 to encryption resource 230 that, in turn, encrypts the transcoded content X2-EF2 and stores it in the repository 180. Accordingly, in certain embodiments, the content X2-EF1 is not necessarily stored and later retrieved for transcoding. Instead, the content X2-EF1 is transcoded into content X2-EF2 for storage in repository 180.

Note that embodiments herein are further applicable to multiple-tuner, multiple-decryption devices. The device may be low cost and may not contain a dedicated transcoding processor. All transcoding may need to be performed by a central processor that performs many different tasks. Embodiments herein can include a sequence involving the use of multiple tuners, PID filters, a CableCARD (these currently have the capability to decrypt six simultaneous channels), temporary storage, a timer microprocessor, and the main processor. As discussed above with respect to FIG. 3, a user 108 can request the recording of specific content via a graphical user interface generated by the DVR SOC. In such an instance, the user selects a program to record via the interface and the time, metadata associated with the program—Frequency, PID, start time, end time, Actors, etc—is stored to local storage along with a reference number. The reference number as well as the start time can be communicated to the scheduler resource 228 such as an external timer processor.

By way of a non-limiting example, the scheduler resource 228 can be a small external processor such as the Texas Instruments MSP430 series, Atmel AVR 8 bit series or other that can work as a Real Time Clock and provides at least 1 I/O line for interrupt signaling and 1 serial communications interface—either SPI, I2C, TTL level RS-232 or other.

If the time to record the content is in the future, the user may elect to "turn OFF" the set top box and place it in a sleep or low power mode. Embodiments herein can include removing most of the power to a high-powered DVR SOC and the local storage (disk drive or other). This can be accomplished through a mechanism incorporated in most micro-controllers and SOCs and is generally called "sleep mode." Some SOCs and microcontrollers provide multiple levels of sleep mode in which more and more of the device is powered down and the clock frequency is lowered or even stopped in order to save energy.

When a Real Time Clock (RTC) in the scheduler resource 228 matches one of the stored times, the very low-power timer-processor will assert an I/O pin that is attached to an interrupt pin of the high-powered DVR SOC. Interrupts can be used to asynchronously inform a processor of an internal or external event occurrence. The interrupt used in this case is used to alert the "sleeping" DVR SOC (e.g., controller resource 240) to restore power to its internal devices, start or speed up its execution clock, and begin normal execution.

The interrupt routine can set in motion software that will communicate with the timer processor in the scheduler resource 228 and retrieve the reason(s) for the wake-up call. In this case, the scheduler resource 228 will initiate one or more recordings as mentioned. As part of the message from the scheduler resource 228, the index to the metadata of the recording is included.

In one embodiment, as mentioned, the DVR SOC (e.g., controller resource 240) uses this index to retrieve the metadata associated with the recording and configure the necessary RF Tuners, PID filters, decryption and encryption devices, in order to begin the recording and transcoding of the digital content. Due to the current limitation of six decryptors within a CableCARD, this process may pass information for the recording of up to six real-time video programs.

Once the real-time aspect of recording the content and re-encrypting it to a local encryption method has begun, the decryption and transcoding process may begin if the DVR SOC real-time operating system or controller resource 240 indicates that there is sufficient processing bandwidth to perform the transcoding process and still keep up with other parallel executed processes. The processing priority of the trans-cryption or transcoding process can be lowered or even stopped for later resumption should an additional recording request or other processor demand cause the processor to exceed its real-time limits of processing. In one embodiment, the operating system of the controller resource 240 is pre-emptive; the application of rate-monotonic analysis or other guaranteed scheduling mechanism may be required.

Once the recording, trans-cryption, and transcoding processes within the processing queue have all been completed, the DVR SOC can be placed back into sleep mode until another timer processor interrupt or user interaction occurs.

Note that there currently exists a new DVR SOC that incorporates one or more additional internal processors that are constructed for maximum speed and efficiency at the transcoding process. When fewer transcoding processors are available than transcoding tasks at hand, the utilization of the transcoding processors must also be scheduled. Such scheduling must take into consideration current demands for real-time transcoding in systems that require an MPEG-4 or HEVC H.265 feed. That is, if the system has 3 transcoding processors and is currently transcoding three pieces of content when a user decides to view television on a device that requires transcoding then the system must halt the current transcoding process and re-dedicate the processor to the user.

Figure 4:
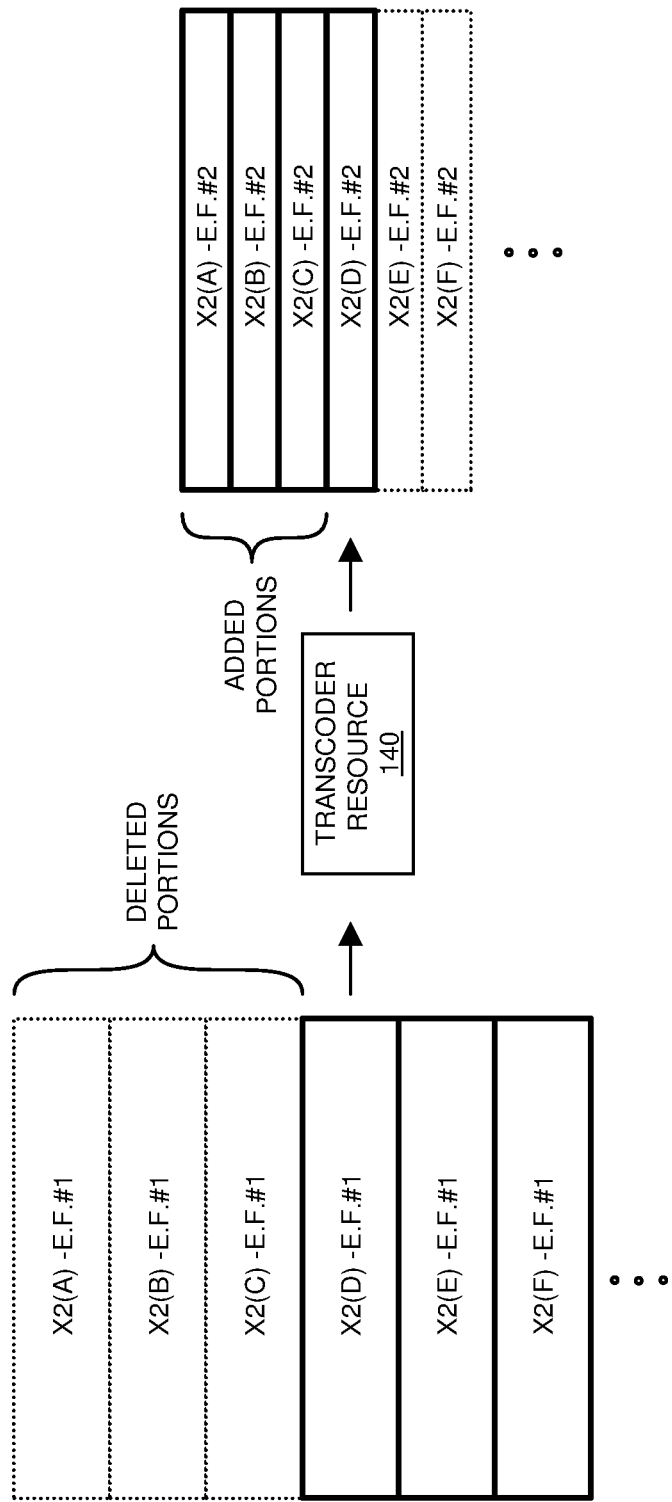
FIG. 4 is an example diagram illustrating transcoding of content according to embodiments herein.

FIG. 4 is an example diagram illustrating transcoding of content according to embodiments herein.

As previously discussed, embodiments herein can include transcoding portions of the first content X2-EF1 into corresponding portions of the second content X2-EF2. For example, as shown, the portion X2(A)-EF1 is transcoded into portion X2(A)-EF2 for storage in repository 180; the portion X2(B)-EF1 is transcoded into X2(B)-EF2 for storage in repository 180; the portion X2(C)-EF1 is transcoded into X2(CB)-EF2 for storage in repository 180; the portion X2(D)-EF1 is transcoded into X2(D)-EF2 for storage in repository 180; and so on.

During a process of successively transcoding the portions X2(A), X2(B), in the first encoding format EF1 into the second encoding format EF2, the controller resource 240 or transcoder resource 140 can be configured to initiate deletion of a respective portion of the content X2-EF1 from the repository 180 in response to detecting that a corresponding portion of content in the second encoding format EF2 derived from the respective portion of the first content has been stored in the repository 180.

More specifically, transcoder resource 140 first transcodes portion X2(A)-EF1 in the first encoding format EF1 into portion X2(A)-EF2 encoded in the second encoding format EF2. Subsequent to storing the portion X2(A)-EF2 in repository 180, the transcoder resource 140 initiates deletion of the portion X2(A)-EF1 from repository 180 as it is no longer needed.

Thereafter, transcoder resource 140 then transcodes portion X2(B)-EF1 in the first encoding format EF1 into portion X2(B)-EF2 encoded in the second encoding format EF2. Subsequent to storing the portion X2(B)-EF2 in repository 180, the transcoder resource 140 initiates deletion of the portion X2(B)-EF1 from repository 180 as it is no longer needed.

Transcoder resource 140 then transcodes portion X2(C)-EF1 in the first encoding format EF1 into portion X2(C)-EF2 encoded in the second encoding format EF2. Subsequent to storing the portion X2(C)-EF2 in repository 180, the transcoder resource 140 initiates deletion of the portion X2(C)-EF1 from repository 180 as it is no longer needed.

The transcoder resource 140 repeats this process until all portions of the content X2-EF1 (e.g., portions X2(A)-EF1, X2(B)-EF1, X2(C)-EF1, etc.) have been converted to corresponding portions of content X2-EF2 (e.g., portions X2(A)-EF2, X2(B)-EF2, X2(C)-EF2, etc.). The process of deleting respective portions in the first encoding format as the corresponding portions of content in the second encoding format are stored in repository 180 immediately frees up storage space in repository 180 for alternative use.

As an alternative to deletion of encoded portions soon after they are transcoded as discussed above, embodiments herein can include first transcoding all portions of the content X2-EF1 into content X2-EF2. Subsequent to completing transcoding of all portions and storing of the transcoded content X2-EF2 in repository 180, the content management resource 120 can initiate deletion of all portions of the content X2-EF1 from the repository 180.

Note that the user 108 may initiate playback of the content X2 in the middle of a process of transcoding the content X2-EF1 into content X2-EF2. For example, the content management resource 120 can be configured to provide notification of a title of available content (e.g., content X2) to the user 108 (such as a subscriber). A first portion of the content (such as X2(A)-EF2, X2(B)-EF2, X2(C)-EF2, X2(D)-EF2) can be encoded and stored in repository 180 in accordance with the second encoding format, EF2. A second portion of the content X2 (such as X2(E)-EF2, X2(F)-EF2, . . . ) can be encoded in repository 180 in accordance with the second encoding format, EF2.

In this latter example embodiment, in response to receiving a selection of the title for playback, the content management resource 120 can be configured to initiate streaming of the portion of the content encoded in accordance with the second encoding format EF2 from the repository 180 followed by streaming of the portion of content encoded in accordance with the first encoding format EF1 from the repository to the subscriber for playback. That is, the content management resource 120 can be configured to decrypt and stream a sequence of portions of the requested content including X2(A)-EF2, X2(B)-EF2, X2(C)-EF2, X2(D)-EF2 followed by transmission of X2(E)-EF2, X2(F)-EF2, . . . to a corresponding playback device 150. Thus, the data stream can include multiple different formats of encoded data.

In one embodiment, the transcoding can be performed as a background task. The controller resource 240 can receive a command to perform a high priority task than transcoding. The command can be received prior to completing a task of transcoding the first content into second content. In response to receiving the command (the higher priority task, if no processing resources are available to continue transcoding, the controller resource 240 can be configured to discontinue the task of transcoding first content into the second content such that the repository stores a portion of the first content and a portion of the second content. As mentioned, the user may still have access to the data stored in accordance with multiple different encoding formats.

Figure 5:
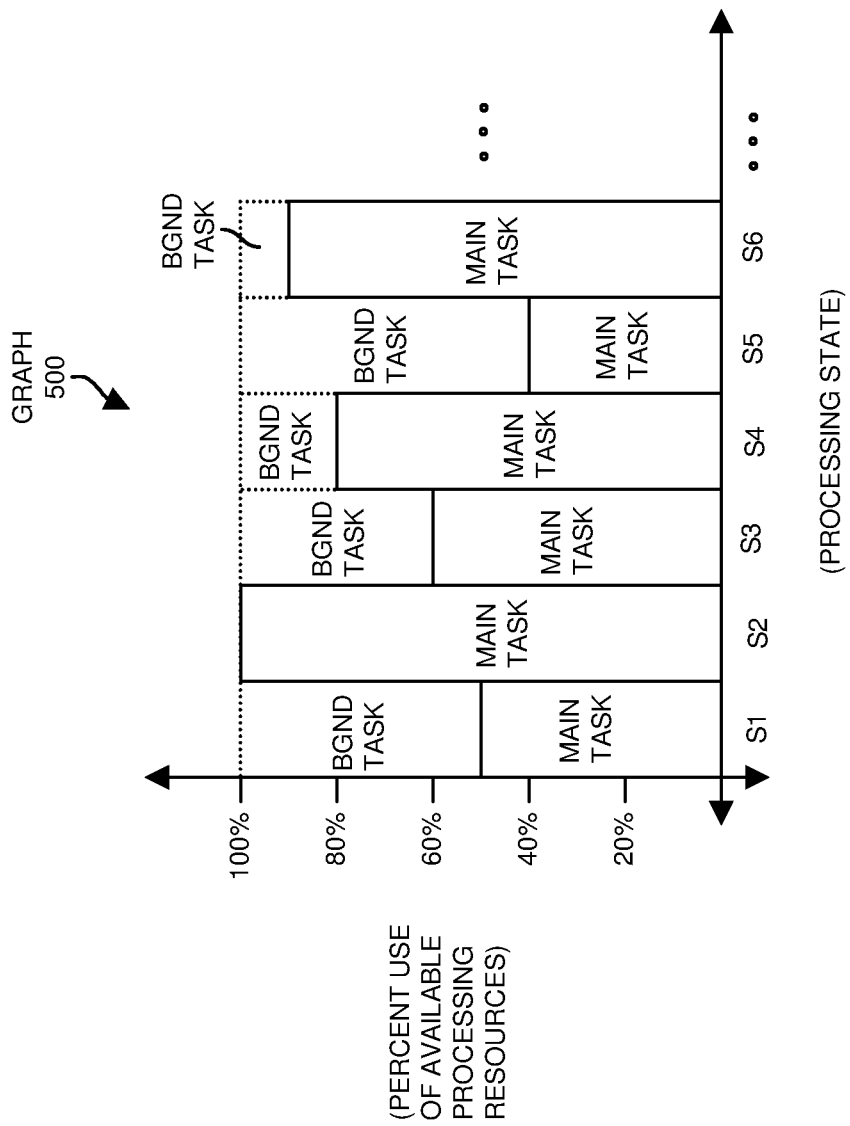
FIG. 5 is an example diagram illustrating transcoding of content as a background task with respect to a main task according to embodiments herein.

FIG. 5 is an example diagram illustrating transcoding of content as a background task according to embodiments herein.

As previously discussed, the controller resource 240 can be configured to perform multiple tasks in parallel. In one embodiment, the controller resource 240 of content management resource 120 allocates resources to initiate processing and storage of content X2-EF1 in repository 180. The content X2-EF1 is encoded in accordance with a first encoding format. The controller resource 240 can be configured to schedule transcoding of the content X2-EF1 into a second encoding format EF2 as a background task. As a multi-tasking processor respective, the controller resource 240 initiates execution of a particular command as a main processing task. The particular command can be a command received from the user 108 indicating to playback content on a respective playback device. The command to playback content can be given highest priority while a task of transcoding the stored content can be a background task having a lower priority. To carry out execution of the parallel tasks (e.g., the particular command and the background task of transcoding), the controller resource 240 interleaves execution of the main processing task and the background task of transcoding.

More specifically, graph 500 illustrates availability of processing resources to perform tasks over time during different processing states S1, S2, S3, S4, and so on. Assume in this example that the controller resource 240 initiates parallel processing of a main task of executing a command inputted by the user to retrieve content Y from the repository and play it back on the playback device 150. This task is given highest priority to provide the user 108 with a good viewing experience. Assume that the controller resource 240 has also scheduled transcoding of the content X2-EF1 into content X2-EF2 as a lower priority background task.

As shown in graph 500, the amount of processing resources needed to execute the main task can vary over time during different states. For example, during state S1, the main task requires 50% of available processing resources (associated with content management resource 120) to complete the portion of the main task in state S1. In this example embodiment, the controller resource 240 utilizes the portion (50%) of leftover processing capability to at least start transcoding of the content X2-EF1 to the content X2-EF2.

Note that the leftover amount of processing capability in state S1 may only be able to perform a small amount of the background task of transcoding. However, a combination of the leftover processing capability during multiple states may be sufficient to complete transcoding of the content in a reasonable time. For example, there is no leftover processing capability in state S2 to perform the background task of transcoding. In this instance, the controller resource 240 does not allocate any portion of state S2 to perform transcoding.

There is a portion (40%) of leftover processing capability in state S3 to perform the background task of transcoding the content X2-EF1 into content X2-EF2. In this instance, the controller resource 240 allocates the leftover portion of 40% in state S3 to perform the background task of transcoding.

Accordingly, the amount of processing resources needed to perform a main task may vary over time. In each respective state, after performing processing required for completion of the main processing task, the leftover processing capability in the respective state can be used to perform a task of transcoding content stored in repository 180. Accordingly, embodiments herein include executing the background task of transcoding the stored content into the second encoding format in between states of completing execution of the main processing task.

In one embodiment, the controller resource 140 is configured to assign each of multiple tasks a different priority level. For example, in the present example, the controller resource 140 can be configured to assign the main task a higher priority level than a priority level assigned to the background task of transcoding the content X2-EF1 into content X2-EF2. As mentioned, the higher priority tasks (e.g., main task) is given more processing time during a respective state.

Accordingly, embodiments herein can include transcoding first content (e.g., content X2-EF1) into the second content (e.g., content X2-EF2) as a background task to performing a higher priority subscriber inputted command to manage content received over a shared cable network communication link such as communication link 170-1.

Note that the states S1, S2, S3, S4, etc., can represent segments of time in which a finite amount of processor resources are available to execute a task.

Figure 6:
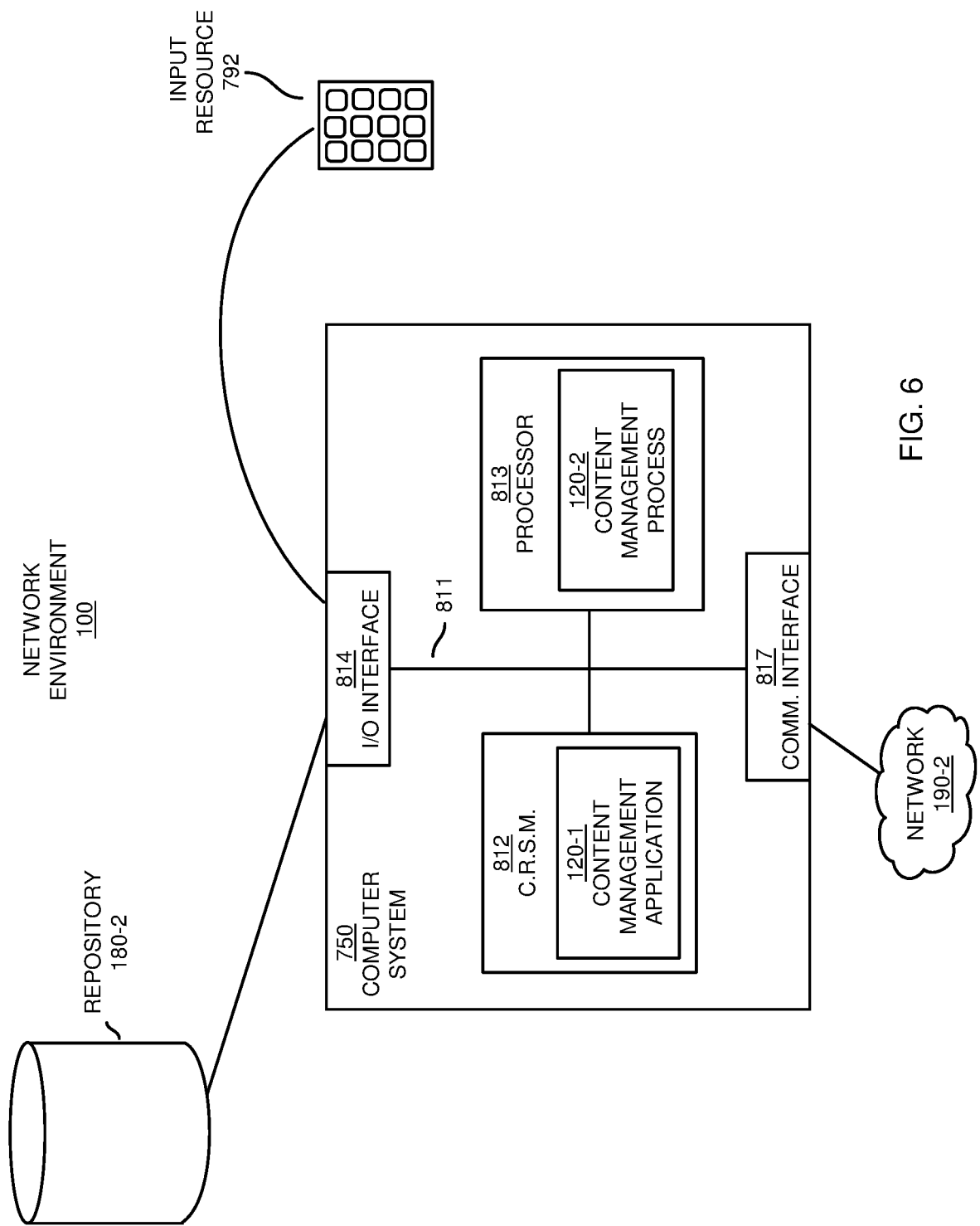
FIG. 6 is a diagram illustrating an example computer architecture in which to execute any of the functionality according to embodiments herein.

FIG. 6 is an example block diagram of a computer device for implementing any of the operations as discussed herein according to embodiments herein.

As shown, computer system 750 such as content management resource 120 of the present example can include an interconnect 811 that couples computer readable storage media 812 such as a non-transitory type of media (i.e., any type of hardware storage medium) in which digital information can be stored and retrieved, a processor 813 (e.g., one or more processor devices of hardware, processor hardware, etc.), I/O interface 814, and a communications interface 817.

I/O interface 814 provides connectivity to a repository 180 and, if present, other devices such as a playback device, display screen, keypad (input resource 792), a computer mouse, etc.

Computer readable storage medium 812 can be any hardware storage resource or device such as memory, optical storage, hard drive, floppy disk, etc. In one embodiment, the computer readable storage medium 812 stores instructions and/or data.

Communications interface 817 enables the computer system 750 and processor 813 to communicate over a resource such as network 190 to retrieve information from remote sources and communicate with other computers. I/O interface 814 enables processor 813 to retrieve stored information from repository 180.

As shown, computer readable storage media 812 is encoded with content management application 120-1 (e.g., software, firmware, etc.) executed by processor 813. Content management application 120-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in content management application 120-1 stored on computer readable storage medium 812.

Execution of the content management application 120-1 produces processing functionality such as content management process 120-2 in processor 813. In other words, the content management process 120-2 associated with processor 813 represents one or more aspects of executing content management application 120-1 within or upon the processor 813 in the computer system 750.

Those skilled in the art will understand that the computer system 750 can include other processes and/or software and hardware components, such as an operating system that controls allocation and use of hardware resources to execute content management application 120-1.

In accordance with different embodiments, note that computer system may be any of various types of devices, including, but not limited to, a computer, a set-top box, a digital video recorder, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, or in general any type of computing or electronic device. The computer system 750 may reside at any location or can be included in any suitable resource in network environment 100 to implement functionality as discussed herein.

Functionality supported by the different resources will now be discussed via flowcharts in FIGS. 7-9. Note that the steps in the flowcharts below can be executed in any suitable order.

Figure 7:
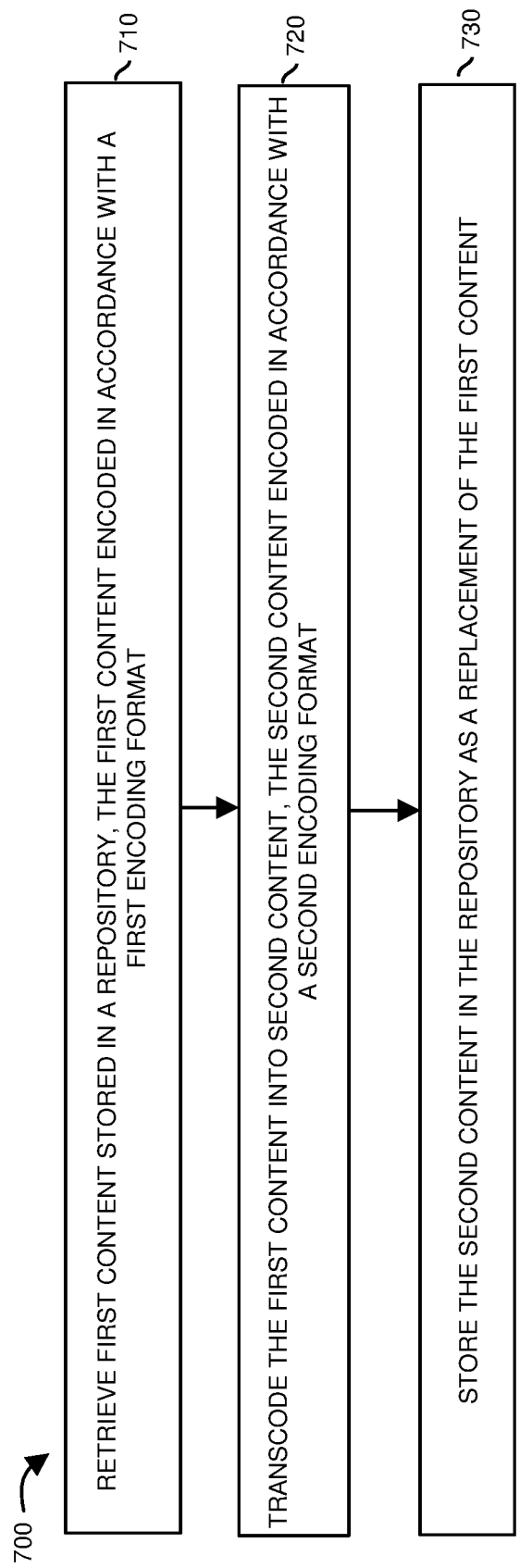
FIGS. 7-9 are example diagrams illustrating different methods according to embodiments herein.

FIG. 7 is a flowchart 700 illustrating an example method according to embodiments. Note that there will be some overlap with respect to concepts as discussed above.

In processing block 710, the transcoder resource 140 retrieves first content such as content X2-EF1 stored in a repository 180-2. The first content is encoded in accordance with a first encoding format, EF1.

In processing block 720, the transcoder resource 140 transcodes the first content into second content such as content X2-EF2. The second content is encoded in accordance with a second encoding format, EF2.

In processing block 730, the transcoder resource 140 stores the second content (content X2-EF2) in the repository 180 as a replacement for the first content (content X2-EF1).

Figure 8:
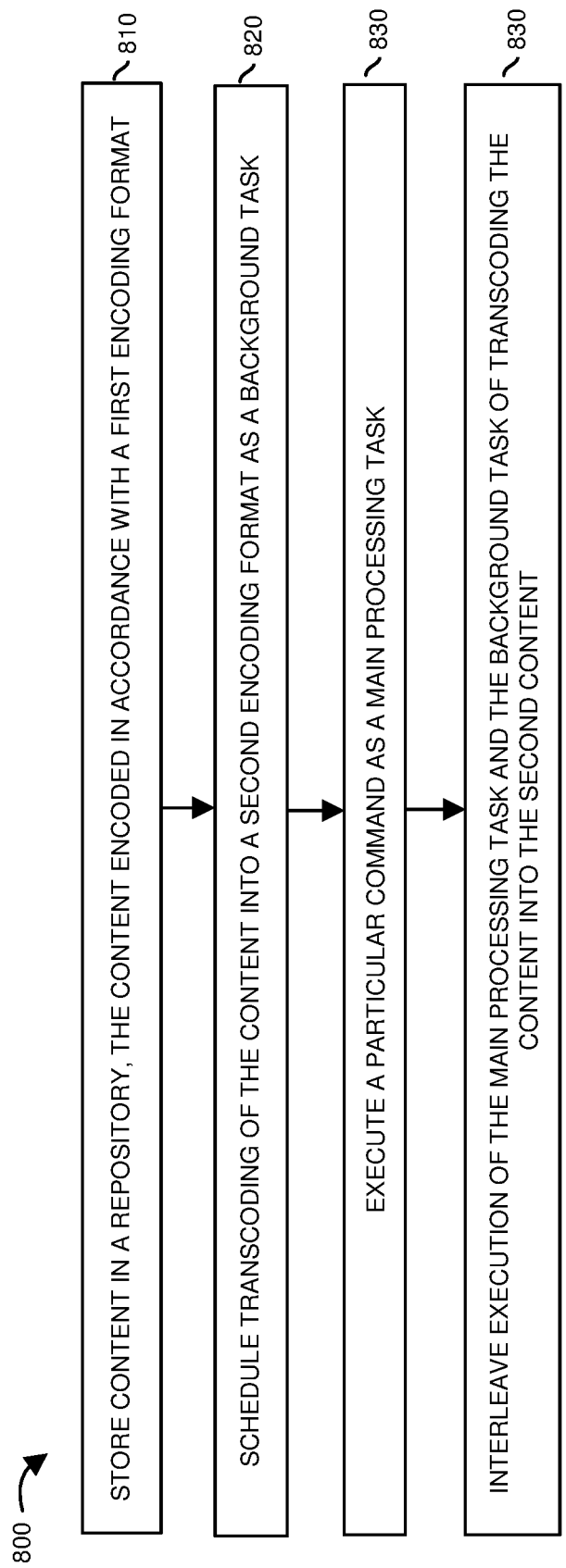

FIG. 8 is a flowchart 800 illustrating an example method according to embodiments. Note that there will be some overlap with respect to concepts as discussed above.

In processing block 810, the content management resource 120 stores content in a repository 180. The content can be encoded in accordance with a first encoding format.

In processing block 820, the content management resource 120 schedules transcoding of the stored content into a second encoding format as a background task.

In processing block 830, the signal processor resource 120 executes a particular command (received from user 108) as a main processing task.

In processing block 840, the content management resource 240 interleaves execution of the main processing task and the background task of transcoding the content into the second encoding format.

Figure 9:
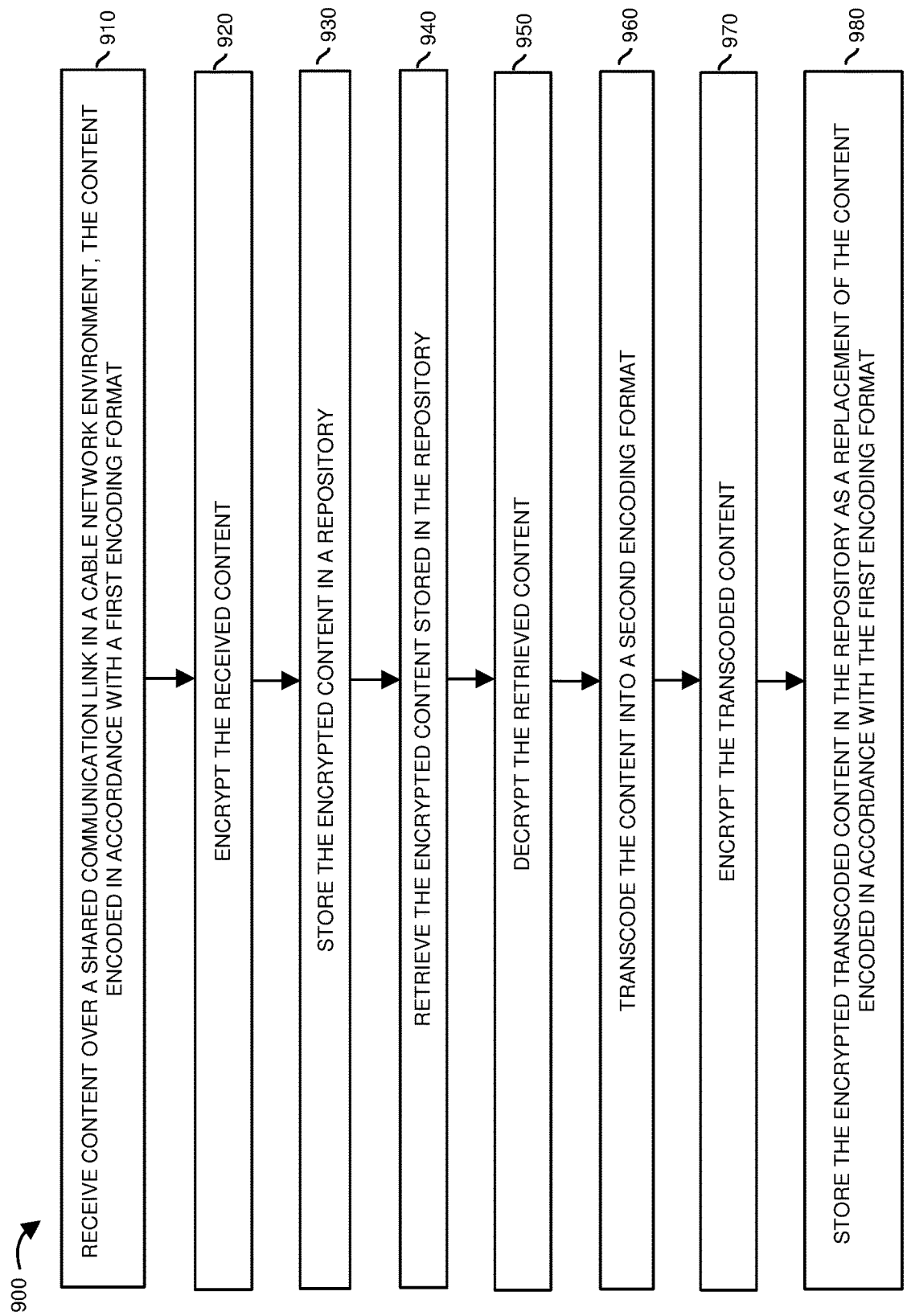

FIG. 9 is a flowchart 900 illustrating an example method according to embodiments. Note that there will be some overlap with respect to concepts as discussed above.

In processing block 910, the content management resource 120 receives content over a shared communication link 170-1 in a cable network environment. The received content is encoded in accordance with a first encoding format.

In processing block 920, the encryption resource 230 of content management resource 120 encrypts the received content.

In processing block 930, the content management resource 120 stores the encrypted content in repository 180.

In processing block 940, the content management resource 120 retrieves the encrypted content stored in the repository 180.

In processing block 950, the decryption resource 235 in content management resource 120 decrypts the retrieved content from repository 180.

In processing block 960, the transcoder resource 140 transcodes the content into a second encoding format.

In processing block 970, encryption resource 230 (or other suitable resource) encrypts the transcoded content produced by transcoder resource 140.

In processing block 980, the signal processor resource 120 stores the encrypted transcoded content in the repository 180 as a replacement for the content encoded in accordance with the first encoding format.

Note again that techniques herein are well suited for managing processing and storage of content. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   retrieving a first portion of first content stored in a repository, the first content encoded in accordance with a first encoding format;
   transcoding the first portion of the first content into a corresponding first portion of second content, the second content encoded in accordance with a second encoding format; and
   storing the corresponding first portion of the second content in the repository as a replacement to the first portion of the first content in the repository; and
   wherein storing the corresponding first portion of the second content in the repository as a replacement to the first portion of the first content in the repository includes: prior to transcodinq the first content in its entirety into the second content: i) storing the corresponding first portion of the second content in the repository, and ii) deleting the first portion of the first content in the repository.

2. The method as in claim 1, wherein the first content is received over a channel of a shared cable network communication link, the method further comprising:
   transcoding the first content into the second content as a background task to performing a higher priority subscriber inputted command to manage content received over the shared cable network communication link.

3. The method as in claim 1, wherein the second encoding format provides higher encoding compression of data than the first encoding format.

4. The method as in claim 1 further comprising:
decrypting the first content;
wherein transcoding the first content includes transcoding the decrypted first content into the second content; and
wherein storing the second content in the repository as a replacement to the first content includes: storing the second content as encrypted content and deleting the first content.

5. The method as in claim 4 further comprising:
receiving a particular command with respect to the first content, the first content received over a shared cable network communication link;
assigning a first priority level to a task of transcoding the first content into the second content; and
assigning a second priority level to execute the particular command, the second priority level being greater than the first priority level.

6. The method as in claim 5 further comprising:
executing the particular command as a main processing task, transcoding of the first content into the second content being a background task with respect to the main processing task; and
interleaving execution of the main processing task and the background task of transcoding the first content into the second content.

7. The method as in claim 1 further comprising:
monitoring an amount of available storage capacity in the repository; and
transcoding the first content into the second content in response to detecting that the amount of available storage capacity of the repository is below a threshold value.

8. The method as in claim 1 further comprising:
receiving a command to perform a high priority task, the command received prior to completing a task of transcoding the first content into the second content; and
in response to receiving the command, discontinuing the task of transcoding the first content into the second content such that the repository stores a portion of the first content encoded in accordance with the first encoding format and a portion of the second content encoded in accordance with the second encoding format.

9. The method as in claim 8 further comprising:
providing notification of a title of available content to a subscriber, the title representing the content encoded as the first content and the second content; and
in response to receiving a selection of the title of available content, initiating streaming of a portion of the second content from the repository followed by streaming of a portion of the first content from the repository to the subscriber for playback.

10. The method as in claim 1, wherein the second encoding format supports a substantially same level of quality playback as the first encoding format.

11. The method as in claim 1 further comprising:
retrieving a second portion of the first content from the repository subsequent to storing the first portion of the second content in the repository;
transcoding the second portion of the first content into a corresponding second portion of the second content; and storing the corresponding second portion of the second content in the repository as a replacement to the second portion of the first content in the repository.

12. The method as in claim 1 further comprising:
transmitting a transcoded portion of the first content retrieved from the repository to a recipient; and
transmitting a not-yet-transcoded portion of the first content retrieved from the repository to the recipient.

13. A computer system comprising:
processor hardware; and
a hardware storage resource coupled to the processor hardware, the hardware storage resource storing instructions that, when executed by the processor hardware, cause the processor hardware to:
retrieve a first portion of first content stored in a repository, the first content encoded in accordance with a first encoding format;
transcode the first portion of the first content into a corresponding first portion of second content, the second content encoded in accordance with a second encoding format; and
store the corresponding first portion of the second content in the repository as a replacement to the first portion of the first content in the repository; and
wherein storage of the corresponding first portion of the second content in the repository as a replacement to the first portion of the first content in the repository includes: prior to transcoding the first content in its entirety into the second content: i) storage of the corresponding first portion of the second content in the repository, and ii) deletion of the first portion of the first content in the repository.

14. The computer system as in claim 13, wherein the second encoding format provides higher encoding compression of data than the first encoding format.

15. The computer system as in claim 13, wherein the processor hardware is further operable to:
monitor an amount of available storage capacity in the repository; and
transcode the first content into the second content in response to detecting that the amount of available storage capacity in the repository is below a threshold value.

16. The computer system as in claim 13, wherein the processor hardware is further operable to:
transmit a transcoded portion of the first content retrieved from the repository to a recipient; and
transmit a not-yet-transcoded portion of the first content retrieved from the repository to the recipient.

17. Computer-readable hardware storage having instructions stored thereon, the instructions, when carried out by processor hardware, cause the processor hardware to:
retrieve a first portion of first content stored in a repository, the first content encoded in accordance with a first encoding format;
transcode the first portion of the first content into a corresponding first portion of second content, the second content encoded in accordance with a second encoding format; and
store the corresponding first portion of the second content in the repository as a replacement to the first portion of the first content in the repository;
wherein storage of the corresponding first portion of the second content in the repository as a replacement to the first portion of the first content in the repository includes: prior to transcodinq the first content in its entirety into the second content: i) storage of the corresponding first portion of the second content in the repository, and ii) deletion of the first portion of the first content in the repository.

18. The computer system as in claim 13, wherein the first content is received over a channel of a shared cable network communication link, the processor hardware further operative to:
transcode the first content into the second content as a background task to performing a higher priority subscriber inputted command to manage content received over the shared cable network communication link.

19. The computer system as in claim 13, wherein the processor hardware is further operative to:
decrypt the first content;
transcode the decrypted first content into the second content; and
store the second content as encrypted content and delete the first content, the encrypted second content being a replacement to the first content.

20. The computer system as in claim 19, wherein the processor hardware is further operative to:
receive a particular command with respect to the first content, the first content received over a shared cable network communication link;
assign a first priority level to a task of transcoding the first content into the second content; and
assign a second priority level to execute the particular command, the second priority level being greater than the first priority level.

21. The computer system as in claim 20, wherein the processor hardware is further operative to:
execute the particular command as a main processing task, transcoding of the first content into the second content being a background task with respect to the main processing task; and
interleave execution of the main processing task and the background task of transcoding the first content into the second content.

22. The method as in claim 1, wherein the repository, prior to transcoding of the first content in its entirety into the second content, temporarily stores multiple yet-to-be transcoded portions of the first content after multiple previously transcoded portions of the first content have been deleted from the repository.

23. The method as in claim 1, wherein the repository, prior to transcoding of the first content in its entirety into the second content, stores multiple previously transcoded portions of the first content as multiple portions of the second content in the repository, the multiple portions of the second content being a replacement to the deleted multiple previously transcoded portions of the first content.

24. The method as in claim 22 further comprising:
in response to receiving a request for retrieval of a title of content represented by the first content and the second content, communicating a transcoded portion of the first content and a not-yet-transcoded portion of the first content from the repository in a data stream to the recipient prior to completing transcoding of the first content into the second content.

25. The method as in claim 12 further comprising:
transmitting the transcoded portion of the first content and the not-yet-transcoded portion of the first content from the repository in a data stream to the recipient prior to completing transcoding of the first content into the second content.

26. The method as in claim 1 further comprising:
providing notification of availability of a title of content to a subscriber, a portion of the title of content represented by transcoded portions of the first content and yet-to-be transcoded portions of the first content.

27. The method as in claim 1 further comprising:
after deleting the first portion of the first content from the repository:
retrieving a second portion of the first content stored in the repository; and
transcoding the second portion of the first content into a corresponding second portion of second content, the second content encoded in accordance with the second encoding format.

28. The method as in claim 27 further comprising:
after deleting the first portion of the first content from the repository and transcoding the second portion of the first content into the corresponding second portion of second content:
storing the corresponding second portion of the second content in the repository as a replacement to the second portion of the first content in the repository.

29. The method as in claim 28 further comprising:
deleting the second portion of the first content from the repository.

30. The method as in claim 1 further comprising:
performing operations of the retrieving and the transcoding of the first portion of the first content after a second portion of the first content has been deleted and transcoded in accordance with the second encoding format.

31. The method as in claim 1, wherein the first portion of the first content is transcoded after multiple portions of the first content have been deleted.

* * * * *